Patented Jan. 4, 1927.

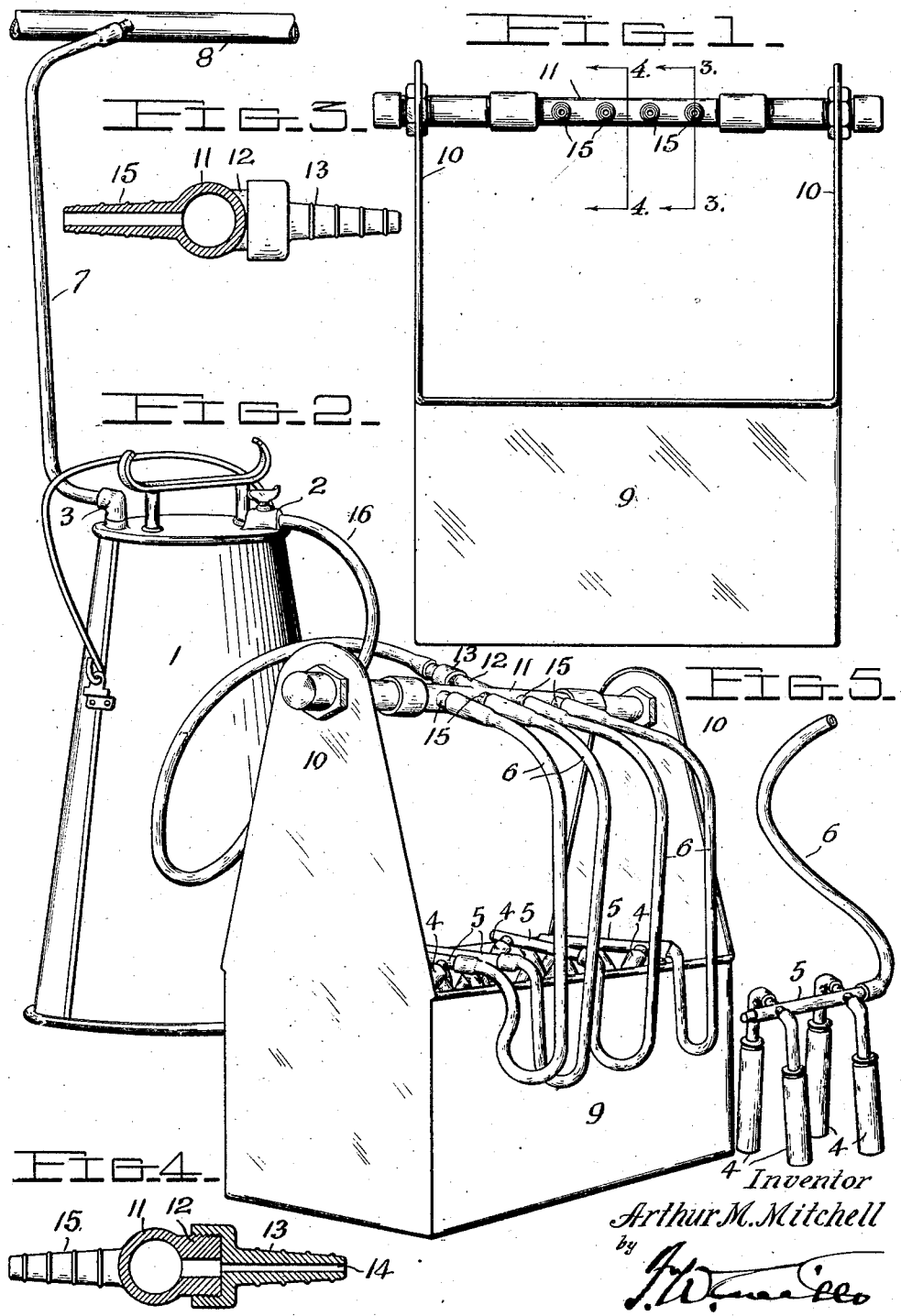

1,613,185

UNITED STATES PATENT OFFICE.

ARTHUR M. MITCHELL, OF WASHINGTON, CONNECTICUT.

METHOD OF CLEANSING MILKING-MACHINE UNITS.

Application filed June 16, 1926. Serial No. 116,255.

This invention relates to method of cleansing milking machine units, the object being as follows:—

First to remove bacteria and to thoroughly cleanse all parts of the units as well as the nipples of the milking pails with which the units are connected.

Second, to readily rinse all the parts after cleansing.

Third, to enable the cleansing and rinsing operations to be performed in a very short time.

Fourth, to cleanse and rinse a plurality of units simultaneously.

There has been a noticeable decrease in the use of milking machines owing solely to the great difficulty experienced in cleansing the milking units, and heretofore no method has been available whereby such units may be thoroughly and expeditiously cleansed and rinsed, so that milk passed through said units would be accepted as sanitary.

An approved method of cleansing and sterilizing the milking units as heretofore practiced by dairymen, consisted in first rinsing the units with cold or lukewarm water drawn through the units by vacuum, breaking the flow occasionally by pulling the teat cups out of the water and then immediately immersing them again for about a dozen times; then repeating this rinsing using hot water containing washing powder, the teat cups being washed at this time with a brush; then again rinsing the units with clean water drawn through by vacuum; then submerging all the parts in a tank of clean water, heating the water to a temperature of about 160° F., allowing the parts to remain in the tank for from fifteen to thirty minutes, the water being allowed to cool and the parts remaining therein until the next milking. Care must be taken, unless steam is used as a heating medium, not to place the parts in the water until the proper temperature has been reached and the heating discontinued, since otherwise, these parts being of rubber, may be injured by coming into close contact with the heating medium.

In addition to the above, the units should be taken apart and washed thoroughly with brushes and hot water containing washing powder every two weeks.

While the method just described is certainly efficient, its use is really prohibitory owing to the time consumed and the attendant expense, whereas, by the method followed by the present invention, the cleansing of four units is effected in less than ten minutes, without any sterilizing whatever, and at no material expense.

Certain drawings form a part of this application which show one form of apparatus for carrying out the invention, and in these drawings—

Figure 1 is a side elevation of the cleansing tank—

Figure 2 is an elevation, partly in perspective, of the apparatus used in cleansing, with a plurality of milking units installed for cleaning—

Figure 3 is a detail section, at the line 3—3 of Figure 1—

Figure 4 is a detail section, at the line 4—4 of Figure 1, and

Figure 5 is a detail perspective of one of the milking units.

In the following description similar numerals of reference will be used to designate like parts in the several figures of the drawing.

1 is the usual vacuum milking pail having inlet 2 and outlet 3, the former connecting with a milking unit lead to admit milk within the pail, while the latter is connected to a suction pump to draw the air from the pail, as will be more in detail explained hereafter.

Each milking unit comprises four teat cups 4 that are connected with a claw 5 to the open end of which latter is connected the unit lead pipe 6 made of rubber, and when the unit is in use this pipe is connected within the inlet 2 of the milking pail.

A rubber pipe 7 is connected with the outlet 3 of the pail and with a suction pipe 8 whereby a partial vacuum is constantly created within the pail which causes the milk to be drawn into the pail through the milking units.

All the constructions above described constitute the approved form of milking machine now used, and the present invention is particularly adapted for cleansing the same.

9 is a tank having its ends extended upwardly above the body of the tank to provide supports 10, and secured to these supports so as to bridge the space therebetween is a pipe 11 closed at the ends, and extending laterally from this pipe is an outlet nipple 12 externally threaded, and driven on this nipple is an egress nozzle 13 having therethrough a very small opening 14.

From the sides of the pipe 11 opposite the nipple 12 extend ingress nozzles 15, the openings therethrough, as well as the openings in said pipe and nipple, being all very much greater than the opening 14, for the purpose presently to be explained.

As will be noted at Figure 2, the unit leads 6 have been disconnected from the inlet nipples of their respective milking pails, and connected with the ingress nozzles 15 of the pipe 11, while the teat cups 4 are submerged within a cleansing liquid contained within the tank 9, and a rubber hose 16 is connected with the egress nozzle 13 of said pipe and with the inlet 2 of the milking pail. No pains need be taken in placing the teat cups and claws within the solution in the tank since it does no harm to mass them together when so placing them.

As the vacuum in the pail is created from the suction pump, the cleansing solution will be drawn through the teat cups and all parts of each milking unit, and through the hose 16 into the milking pail, but the progress of the solution will be greatly retarded owing to the restricted opening in the egress nozzle 13, while at the same time the degree of suction will not be varied, and accordingly there will be a pronounced current to the solution. This restricted opening retards the progress of the solution through the milking units so that all internal surfaces of each unit will be under the influence of the cleansing solution for about five minutes, the current of the solution having a washing effect.

The passage of the solution in this manner through the units will remove practically all the bacteria, but, as soon as the units have been treated in this manner, the hose 16 is withdrawn from the nozzle 13, and the latter disconnected from the nipple 12, and a hose coupled to this nipple and leading from a water supply pipe, so that a large volume of water may rush under pressure through the pipe 11 and the milking units and thoroughly rinse all parts and remove any bacteria that may be then present.

This manner of cleansing will thoroughly cleanse the milking units required for a herd of fifty cows in less time than a single unit has heretofore been cleaned.

The pail may be emptied, and the solution renewed in the tank, during the flushing of a set of previously cleansed units.

After milking, it is merely necessary to disconnect the unit leads from their milking pails and connect them with the nozzles 15, and submerge the teat cups in the solution.

What is claimed is:—

The method of cleansing milking machine units, which consists in drawing by suction a cleansing solution through said units, and retarding the flow of the solution without varying the degree of suction, whereby the solution may effect a retting and cleansing action on the units.

In testimony whereof I affix my signature hereto.

ARTHUR M. MITCHELL.